United States Patent
Kasama (10) Patent No.: US 7,971,201 B2
(45) Date of Patent: Jun. 28, 2011

(54) MULTIPLE OPERATING DEVICE VERSION SOFTWARE GENERATING SYSTEM AND MULTIPLE OPERATING DEVICE VERSION SOFTWARE GENERATION SUPPORT PROGRAM AND METHOD

(75) Inventor: Kouichirou Kasama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1246 days.

(21) Appl. No.: 11/474,426

(22) Filed: Jun. 26, 2006

(65) Prior Publication Data

US 2007/0220496 A1   Sep. 20, 2007

(30) Foreign Application Priority Data

Mar. 20, 2006 (JP) ................................. 2006-077117

(51) Int. Cl.
    *G06F 9/44* (2006.01)
(52) U.S. Cl. ........................................................ 717/170
(58) Field of Classification Search ................... 717/170
    See application file for complete search history.

(56) References Cited

U.S. PATENT DOCUMENTS

| | | | | |
|---|---|---|---|---|
| 5,649,200 A | * | 7/1997 | Leblang et al. ............. | 717/122 |
| 2004/0003383 A1 | * | 1/2004 | Chenier ...................... | 717/154 |
| 2005/0216486 A1 | * | 9/2005 | Barshefsky et al. .......... | 707/100 |
| 2006/0064681 A1 | * | 3/2006 | Robinson ..................... | 717/141 |
| 2007/0055963 A1 | * | 3/2007 | Waddington et al. ......... | 717/140 |

FOREIGN PATENT DOCUMENTS

| | | |
|---|---|---|
| JP | 09-204302 | 8/1997 |
| JP | 2002-032223 | 1/2002 |

* cited by examiner

*Primary Examiner* — Philip Wang
(74) *Attorney, Agent, or Firm* — Fujitsu Patent Center (57) ABSTRACT

A multiple operating device version program generating device for generating software for multiple versions of an operating device, has an environment file storage unit having environment file storage folders, prepared for multiple versions of an operating device, each storing environment files including a library, at least one source program, and a compile and link operation instruction file; a generation environment table defining storage positions of the versions of the operating device and the environment file storage folders; a generation environment storage unit storing the environment files when generating the software; a software generation environment construction unit for copying environment files for specific versions of the operating device in the generation environment storage unit; and a software generating processing unit for executing the compile and link operations based on the compile and link operation instruction files in the generation environment storage unit.

5 Claims, 3 Drawing Sheets

MULTIPLE OPERATING DEVICE VERSION SOFTWARE GENERATING SYSTEM AND MULTIPLE OPERATING DEVICE VERSION SOFTWARE GENERATION SUPPORT PROGRAM AND METHOD

CROSS REFERENCE TO RELATED APPLICATION

This application is based upon and claims the benefit of priority from the prior Japanese Patent Application No. 2006-77117, filed on Mar. 20, 2006, the entire content of which is incorporated herein by reference.

BACKGROUND OF THE INVENTION

1. Field of the Invention

The present invention relates to a multiple operating system version software generating device for generating software for different versions of an operating system and a multiple operating system version software generation support program and method relating to the same, more particularly relates to a multiple operating system version software generating device which compiles and links source programs and environment files for the generated software in accordance with the versions of the operating system and a multiple operating system version generation support program and method relating to the same.

2. Description of the Related Art

In recent years, almost all software used in personal computers, servers, personal digital assistants (PDAs), etc. are designed to run on specific versions of operating systems. To generate software running on a specific version of an operating system, it is necessary to develop a source program defining the functions unique to that software, convert that source program as required for that specific version of the operating system by a compiler, and link it to a library etc. required for that version of the operating system. In this way, to generate software running on a certain operating system, it is necessary compile the source program, link to a library, etc. for each of the many versions of the operating system.

The library differs depending on the type of the operating system. Further, the library, developer kit, application protocol interface (API), etc. of the compiler differs for each version of the operating system.

For example, there are three main methods for generating software able to be run on the Windows® operating system. The first is the method of designating the API called the "Software Development Kit (SDK)" as the library. This method utilizes the set of the library and headers for calling up "Win32" (API required for making computer execute processing in Windows® operating system). Software generated utilizing the SDK directly designates Win32 for control of a processor, so enables a processor to execute detailed processing.

The second is the method of designating the Microsoft Foundation Class (MFC), .NET, or other class library as the library. A "class" is a set of a data structure and processing. Unnecessary information is not divulged outside, therefore this is effective when preparing a library for shared use by a number of programmers. In addition, this has features such as variable declaration at any location, multiple definition for changing the functions of operators, and acquisition and release of dynamic memory. This method may be said to be optimal for medium size and larger software development.

Further, a library based on that class, that is, a "class library", forms an abstract high grade interface. For example, one class of one type of class library, that is, the MFC, may cover five to 20 SDK functions. For that reason, a single call to the class library enables targeted processing to be simply executed. This method is in one respect restricted in terms of control of processing of the processor by the SDK, but has the great advantage of enabling the manhours spent in development work to be slashed.

The usual method for utilization of such a class library is use of a compile tool using a class library to simplify development of a source code, for example, Visual C++®, Visual Studio.NET®, etc. Such a compile tool is provided with a class library in advance and enables addition of a third party class library for compile and link operations. In addition, a batch command file etc. may be used to designate a specific class library, specific dynamic link library (DLL) of SDK or Win32, or API from outside that compile tool.

The above-mentioned library designation methods for generating software able to run on the Windows® operating system do not have to be used alone. They may also be combined. That is, it is possible to use the SDK API for part of the software and use the MFC or other class library for part.

Further, development of such software running on the Windows® operating system requires designation of the SDK, MFC, or other library required for utilization of the Windows® operating system. This is not an issue limited to the Windows® operating system. A similar technique is required for Linux® or Unix® as well.

The third technique is the technique of eliminating the restrictions of such operating system-dependent development and developing software without dependency on the operating system. This technique is made possible by JAVA®. However, JAVA® converts the source code once to an intermediate code and then has that intermediate code executed by a JVM (Java Virtual Machine), so compared with C++ and other native languages, is inferior in terms of the speed of the processing. Further, it is not good at detailed computer processing using Win32. For that reason, when for example high speed processing of a driver etc. and fine control of computer hardware are required, development by JAVA® is unsuitable. Further, in development of software for which high speed processing etc. is not sought as well, the fact is that programmers mastering development languages other than JAVA® will not use JAVA® for development.

Due to the above-mentioned reasons etc., when using an operating system-dependent development language, it is necessary to prepare a different environment for each version of the operating system when developing software designed to run on different versions of the operating system. Further, a different computer is required for each different version of the operating system, so there is the problem that the capital costs for the computers and the work space for the computers increase.

Further, in that case, the source files are stored dispersed among a plurality of computers. For that reason, when source files are changed, it becomes necessary to ensure that the source files be the same in the plurality of environments. However, source files are frequently modified due to the usually required debugging of software after compilation. Therefore, ensuring that the source files are identical in the multiple environments becomes difficult. As a result, sometimes differences arise in the source files. In such a case, the software generated by compiling and linking such differing source files will suffer from the problems of differences in functions for the different versions of the operating systems, insufficient debugging, etc.

Further, to generate software for different versions of an operating system, setting information regarding the compile and link operations such as which libraries to link to or which part of which source program to compile becomes necessary for each version of the operating system. This setting information becomes more complex the greater the number of types and sizes of the libraries linked to in the software. In many cases, when generating the software, it is necessary to manually designate the compile and link setting information to generate the software. Further, when testing the software, that manual setting work has to be repeated for each version of the operating system. Therefore, there is the risk of the developers making errors in the generation of the software.

In the past, a system for automatically generating programs for different types of computers was proposed (for example, see Japanese Patent Publication (A) No. 2002-076886). While this was designed to automatically generate programs, it focused on reutilizing and automatically generating software for different hardware. No method was proposed for automatically generating a source program to deal with different versions of an operating system.

Further, in the past, a multiple operating system application generating system was proposed for automatically converting an application from an original operating system to a new operating system (for example, see Japanese Patent Publication (A) No. 9-204302). However, no specific means was proposed for automatic conversion for different versions of the same operating system.

SUMMARY OF THE INVENTION

An object of the present invention, in view of the problems of the above-mentioned conventional automatic software generating, is to provided a multiple operating system version software generating which prepares a setting file describing a library, source program, and compile and link commands required for generated software for each version of the operating system and uses this to make a compile tool compile and link a library and source codes to automatically generate software for that version of the operating system and a multiple operating system version generation support program and method relating to the same.

According to a first aspect of the present invention, there is provided a multiple operating system version program generating for generating software for multiple versions of an operating system, comprising an environment file storage unit having environment file storage folders, prepared for multiple versions of an operating system, each storing environment files including a library, at least one source program, and a compile and link operation instruction file describing a program instructing at least partial compile and link operations of the at least one source program and compile and link operations of the library; a generation environment table defining storage positions of the versions of the operating system and the environment file storage folders; a generation environment storage unit storing the environment files when generating the software; a software generation environment construction unit for copying and/or installing environment files for specific versions of the operating system in the generation environment storage unit in accordance with the generation environment table; and a software generating processing unit for executing the compile and link operations based on the compile and link operation instruction files in the generation environment storage unit.

Preferably, the compile and link operation instruction files instruct the at least partial compile and link operations of the at least one source program required for the software and the compile and link operations of the library by condition branch instructions based on the versions of the operating system.

According to a second aspect of the present invention, there is provided a multiple operating system version software generation support program for generating software for multiple versions of an operating system, the multiple operating system version software generation support program making a computer run a software generation environment constructing routine for copying and/or installing environment files for specific versions of the operating system in a generation environment storage unit from environment file storage folders, prepared for multiple versions of an operating system, each storing environment files including a library, at least one source program, and a compile and link operation instruction file describing a program instructing at least partial compile and link operations of the at least one source program and compile and link operations of the library, in accordance with a generation environment table defining storage positions of the versions of the operating system and the environment file storage folders and a software generating processing routine for making a compile tool execute the compile and link operations based on the compile and link operation instruction files in the generation environment storage unit.

Preferably, the compile and link operation instruction files instruct the at least partial compile and link operations of the at least one source program required for the software and the compile and link operations of the library by condition branch instructions based on the versions of the operating system.

According to a third aspect of the present invention, there is provided a multiple operating system version software generating method for generating software for multiple versions of an operating system, the multiple operating system version software generating method having a software generation environment constructing step of copying and/or installing environment files for specific versions of the operating system in a generation environment storage unit from environment file storage folders, prepared for multiple versions of an operating system, each storing environment files including a library, at least one source program, and a compile and link operation instruction file describing a program instructing at least partial compile and link operations of the at least one source program and compile and link operations of the library, in accordance with a generation environment table defining storage positions of the versions of the operating system and the environment file storage folders and a software generating processing step of making a compile tool execute the compile and link operations based on the compile and link operation instruction files in the generation environment storage unit.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

Figure 1:
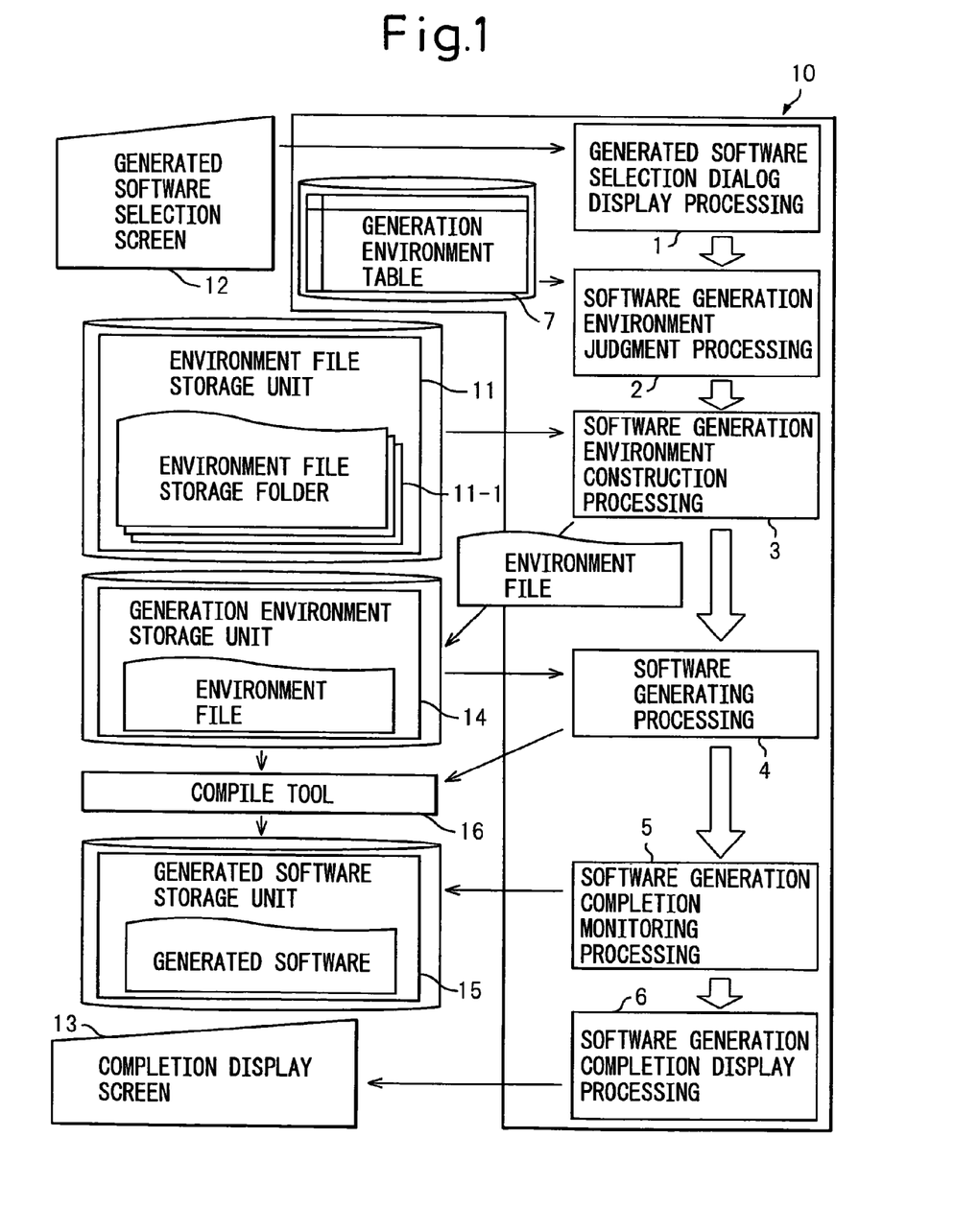
FIG. 1 is a view of the functions of a multiple operating system version software generation support program according to the present invention.

FIG. 1 is a view of the functions of a multiple operating system version software generation support program according to an embodiment of the present invention. This multiple operating system version software generation support program 10 includes, as that generation processing, a generated software selection dialog display processing 1, a software generation environment judgment processing 2, a software generation environment construction processing 3, a software generating processing 4, a software generation completion monitoring processing 5, and a software generation completion display processing 6. This program 10 is run by a processor (not shown) and has a generation environment table 7.

FIG. 1 shows the relationship between the functions of the program 10 and the related storage device and external software such as the compile tool. The external functions include a generated software selection screen 12 and a completion display screen 13 shown on a display (not shown) and an environment file storage unit 11, generation environment storage unit 14, generated software storage unit 15, and compile tool 16.

Next, the functions of the processing of the program 10 and the external functions will be explained.

The generated software selection dialog display processing 1 displays a plurality of types of software and versions of the operating system on a generated software selection screen 12, receives selection data of the type of software and version of the operating system from the generated software selection screen 12, generates a "selection ID" unambiguously determined by the type of software and version of operating system from that data, and sends that "selection ID" to the software generation environment judgment processing 2.

The software generation environment judgment processing 2 selects the path of an environment file storage folder in accordance with the type of software and version of operating system from the different types of software and versions of the operating system. More specifically, the software generation environment judgment processing 2 uses the received "selection ID" as a key to acquire information on the "type of software", "version of operating system", and "environment file storage folder path" from the generation environment table 7. Table 1 shows an example of the generation environment table 7.

TABLE 1

| Selection ID | Type of software | Version of operating system | Environment file storage folder path |
|---|---|---|---|
| 0x01 | USB cable driver | Windows XP Pro 32 bit version | C:\usb\win_xp_32\mk_env |
| 0x02 | USB cable driver | Windows XP Pro 64 bit version | C:\usb\win_xp_64\mk_env |
| 0x03 | USB cable driver | Windows 98 | C:\usb\win_98\mk_env |
| 0x04 | PC card driver | Windows XP Pro 32 bit version | D:\card\win_xp_32\mk_env |
| 0x05 | PC card driver | Windows XP Pro 64 bit version | D:\card\win_xp_64\mk_env |

As described in Table 1, the generation environment table 7 is tabular information of the selection ID, type of software, version of the operating system, and environment file storage folder path. For example, when the generated software selection dialog display processing 1 selects "USB cable driver" as the type of software and "Windows® XP Pro 32 Bit version" as the version of the operating system, the selection ID becomes "0x01".

Therefore, the software generation environment judgment processing 2 sent the selection ID "0x01" uses "0x01" as the key to acquire the type of software "USB cable driver", version of the operating system "Windows® XP Pro 32 Bit version", and environment file storage folder path "C:\usb\win-xp-32\mk-env" from the generation environment table 7.

The "environment file storage folder path" is the folder path of an environment file storage folder 11-1 stored in the environment file storage unit 11. The environment file storage folder 11-1 stores the environment files required for generation of software. For example, in the case of the Windows® operating system, Win32 can designate as the library the SDK, MFC, or other class library, a third party class library kit, etc. If not reliably designating the required environment files in this way, problems such as link errors at the time of linking of libraries will occur. For that reason, the environment file storage folder is provided in advance with a set of environment files free from link errors or errors at the time of execution.

The Software Generation Environment construction processing 3 performs processing for storing the environment files required for software generation in an environment file storage folder in the generation environment storage unit 14. The environment files include, for example, the source files in which the source program is described, a driver development kit (DDK), compile tool, a compile-link operation instruction file (hereinafter referred to as an "operation instruction file"), etc. and a configuration command file instructing the configuration of these environment files. The software generation environment construction processing 3 finds the environment files in the environment file storage folder 11-1 from the environment file storage folder path received from the software generation environment judgment processing 2 and copies or installs the environment files in the generation environment storage unit 14.

The configuration command file in the environment file storage folder 11-1 describes the following information required for the software generation environment construction processing 3 to install or copy environment files stored in the environment file storage folder 11-1 at a predetermined address in the generation environment storage unit 14.

Component (environment file) name
Type of operation (install or copy)
Installation location or copying location (designated by folder path)

The configuration command file is a file designating the names of environment files, types of operation, and folder paths and differentiating whether the environment files are files for installation such as a compile tool or other application or for just copying such as a DLL. The software generation environment construction processing 3 installs or copies each environment files at an installation location or copy location of a predetermined address in accordance with the information of the configuration command file. Due to this, the generation environment storage unit 14 becomes a clean install environment for generating the software concerned.

Depending on the type of the generated software, sometimes installation is not be possible due to a link error or other problem arising due to a file at the same directory as the file to be installed or sometimes errors at the time of execution or other bugs will arise after software generation. To avoid such problems, it is important to install environment files not causing the above-mentioned errors in a clean install environment, that is, an environment with no files. For that reason, constructing a clean install environment such as the generation environment storage unit 14 enables the environment files based on the type of software and version of the operating system to be correctly installed.

By preparing the files required for the generation environments in the environment file storage unit 11 in advance in this way and constructing generation environments in the generation environment storage unit 14 at the time of software generation, it becomes possible to realize a plurality of generation environments in a single computer as compared with the plurality of computers which used to be necessary for the different generation environments.

The operation instruction file in an environment file storage folder 11-1 describes the operation routine such as which source files contained in the environment files stored in the generation environment storage unit 14 the software generating processing 4 should compile, which part of the source codes of the source files it should compile, and, further, which environment files it should link to. In this way, the work of inputting the compile and link commands, which used to be performed manually, can be eliminated by programming them in advance in operation instruction files. By preparing operation instruction files for the different versions of an operating system and selecting the files at the time of generation, it is possible to automatically generate software for the different versions of an operating system. The contents of an operation instruction file will be explained in detail later using a specific example.

The software generating processing 4 executes the instructions of an operation instruction file using the compile tool 16 installed in the generation environment storage unit 14 so as to compile and link the source files, class library, etc. required for generating software stored in the generation environment storage unit 14. The compile tool performs the above-mentioned condition compile operation described in the operation instruction file of course and also performs software generation processing in accordance with the designated specific class library, specific SDK, specific development kit, Win32 specific DLL, Win32 API, and other detailed instructions.

The software generating processing 4 further stores the generated software in the generated software storage unit 15. This storage processing enables storage at a predetermined address position in the generated software storage unit 15 defined in the operation instruction file in accordance with the type of software and version of operating system. Due to this, the compile tool 16 stores the generated software at a predetermined address position.

The operation instruction file generated by the software generating processing 4 can be executed by the compile tool 16 by batch processing. The compile tool 16 compiles the source files, links the necessary library, and generates software in accordance with the instructions of the operation instruction file. The software generating processing 4 notifies the software generation completion monitoring processing 5 of execution of the instructions of the operation instruction file together with information on the type of software, version of the operating system, and environment file storage folder path.

The software generation completion monitoring processing 5 judges the address for generation of the software from the received information on the type of software etc. For example, there is the generated software path information in the generation environment table 7 or operation instruction file in the environment file storage folder path. By searching through this, the software generating address is judged. The software generation completion monitoring processing 5 monitors for software generation at the predetermined position for software generation in the generated software storage unit 15. If confirming this, it sends software generation completion information to the software generation completion display processing 6.

When the software generation completion display processing 6 receives software generation completion information, it performs processing to display the completion of the generated software together with the type of software, version of the operating system, etc. on the completion display screen 13.

In this way, the software for each version of the operating system selected on the generated software selection screen 12 is generated by the above-mentioned processing in the generated software storage unit 15, the completion of generation is displayed, and the processing of the multiple operating system software generation program is ended.

Note that the generation environment storage unit 14 has to provide a clean environment (state with no files) when generating software. For that reason, after once generating software, in order to generate software for the next different version, processing is required to delete all files in the generation environment storage unit 14. This processing is performed in the generated software storage unit 15 when generating software or when the software generation environment construction processing 3 starts processing.

In this way, when generating software for different versions of an operating system, by constructing the generation environment, generating the software, then deleting the generation environment, it is possible to use a single PC to generate software for a plurality of versions of an operating system.

Next, a specific example of the above-mentioned operation instruction file will be explained. That specific example is for example a Makefile used in the C language etc. A Makefile is a file prepared so as to lighten or eliminate compile-link command preparation work performed by human developers when compiling and linking software comprised of a plurality of files.

For example, when part of the source files of generated software depends on other source files, these source files have to be compiled in the correct order. Further, when modifying part of the source files, sometimes the compile sequence is rethought by the developer. This work can be automated by a Makefile. A Makefile is executed by the work of inputting a Makecommand to the computer.

A Makefile can designate details such as the specific class library for compilation, specific SDK, specific development kit (a commercially available development kit etc. for each type of software provided to enable a plurality of APIs of Win32 to be executed by a simple function callup), Win32 specific DLL, Win32 API, etc.

Software for specific versions of an operating system are changed in SDK or class library call parts depending on the version of the operating system, so the code part for calling up the SDK etc. in the source files, for example, a precompile header declaration part, function call part, or variable call part (hereinafter referred to as a "library call part") has to be changed. However, the source code part describing the processing unique to the generated software having no relation to the call parts (hereinafter referred to as the "unique processing code part") is not changed for each version of the operating system. For that reason, rather than preparing a plurality of the unique processing code parts for the different versions of the operating system, it is possible to utilize one in common so as generate different software for the individual versions of the operating system while leaving the unique processing code part unchanged.

The operation instruction files of the embodiment of the present invention are commonly managed without changing the unique processing code part. The library call parts are partially compiled in accordance with the version of the operating system.

For example, as a method for dealing with this, describing the condition compile operation in a Makefile may be considered. That is, it is possible to use conditional branching to set whether to compile a specific source file or to compile a library call part in that specific source file.

An example of condition compile coding of such a Makefile becomes as follows:

DEFINE 0x01//ID at time of Window® XP Pro 32 bit version
DEFINE 0x02//ID at time of Window® XP Pro 64 bit version
DEFINE 0x03//ID at time of Window® 98 bit version
IFDEF (0x01)//start of condition compile
cout <<//library call part covered by compile when identifier is 0x01;
ENDIF//end of condition compile
IFDEF (0x02)
cout <<//library call part covered by compile when identifier is 0x02;
ENDIF//end of condition compile
IFDEF (0x03)
cout <<//library call part covered by compile when identifier is 0x03;
ENDIF//end of condition compile By using a common unique processing code part for different versions of an operating system and condition compiling the library call part which changes with each version of the operating system in this way, it is possible to generate different software for the different versions of an operating system. Further, this technique enables central management of the unique processing code part and enables any change in the unique processing code part to be immediately reflected in the generated software for the different versions of an operating system. Therefore, unlike the past, it is not necessary to manually input compile-link commands for each version of an operating system. An operation instruction file prepared in advance can be automatically selected in accordance with the type of software and the version of operating system to enable automatic software generation. By doing this, it becomes possible to avoid mistakes in generation caused by troublesome software generation processing accompanying source code correction work etc.

The environment files covered by the compile-link operations defined in a configuration command file are copied or installed in the generation environment storage unit 14. For that reason, the position information of the source files or library defined in a configuration command file may also be path information of the generation environment storage unit 14. Further, when installing and starting up the compile tool in the same directory as the source files etc., the current directory of that compile tool may also be designated.

Figure 2:
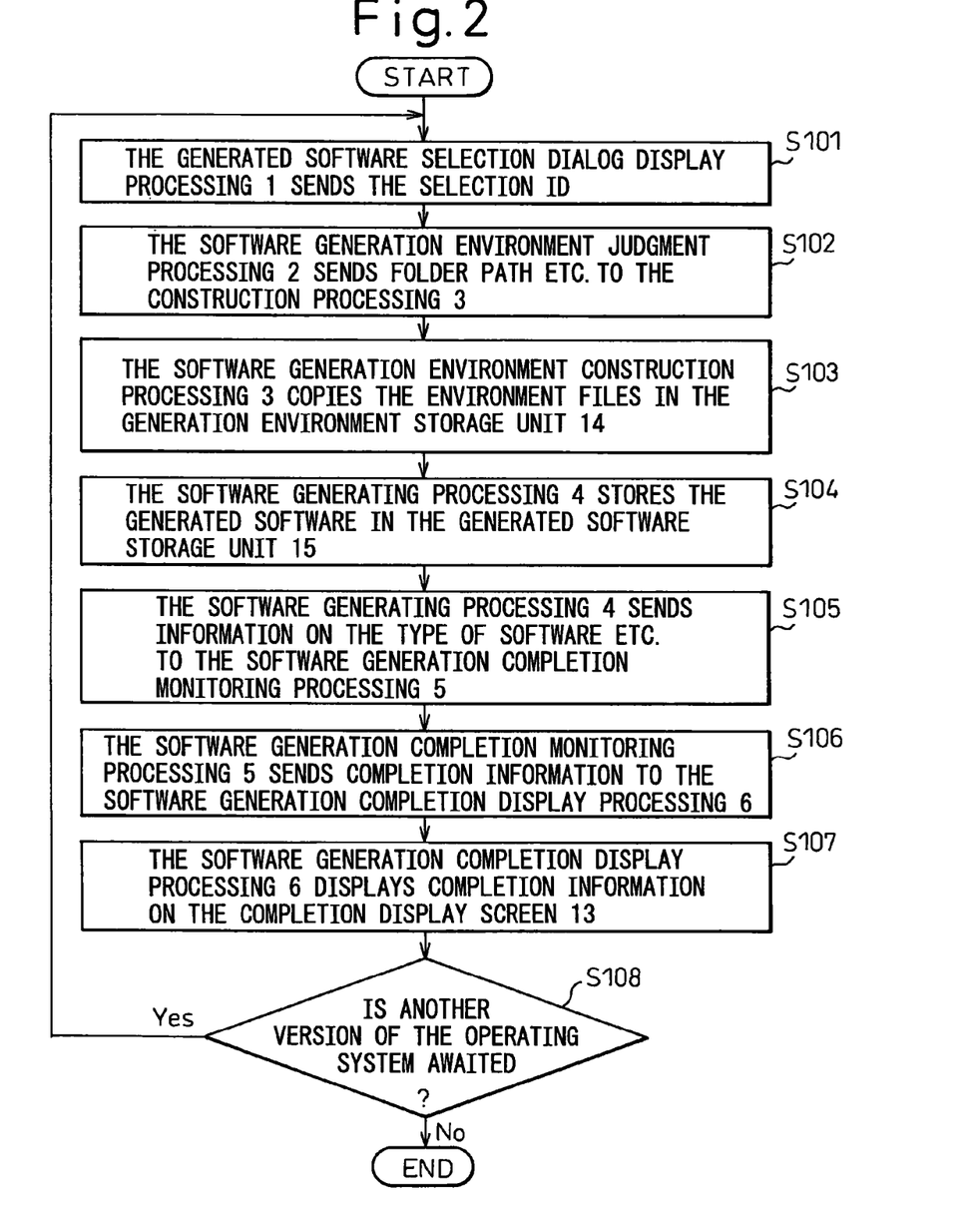
FIG. 2 is a flow chart of the processing of a multiple operating system version software generation support program according to the present invention.

FIG. 2 is a flow chart of the processing of a multiple operating system version software generation support program according to an embodiment of the present invention. Below, the steps of that flow chart will be explained.

At step S101, the generated software selection dialog display processing 1 displays the type of software, version of the operating system, etc. on the generated software selection screen 12. Next, the generated software selection dialog display processing 1 sends the selection ID determined by the type of software and version of the operating system selected by the user to the software generation environment judging means 12, then the routine proceeds to step S102.

At step S102, the software generation environment judgment processing 2 uses the selection ID as a key to acquire information on the type of software, version of the operating system, and environment file storage folder path in the environment file storage unit 11 from the generation environment table 7. The software generation environment judgment processing 2 sends this information to the software generation environment construction processing 3, then the routine proceeds to step S103.

At step S103, the software generation environment construction processing 3 copies or installs the files in the environment file storage folder in the generation environment storage unit 14 in accordance with the configuration command file in the folder and sends information on the type of software, version of the operating system, and environment file storage folder path to the software generating processing 4, then the routine proceeds to step S104.

At step S104, the software generating processing 4 executes an execution command for the instructions of the operation instruction file for compiling a file stored in the generation environment storage unit 14 in accordance with the program described in the operation instruction file. Further, the software generating processing 4 stores the generated software in the generated software storage unit 15, then the routine proceeds to step S105.

At step S105, the software generating processing 4 sends information on the type of software, version of the operating system, and environment file storage folder path to the software generation completion monitoring processing 5, then the routine proceeds to step S106.

At step S106, the software generation completion monitoring processing 5 confirms whether the generated software was generated at the predetermined position of the generated software storage unit 15 by polling and, after confirming generation, sends completion information consisting of the type of software type and version of the operating system information to the software generation completion display processing 6, then the routine proceeds to step S107.

At step S107, the software generation completion display processing 6 displays information of the type of software and version of the operating system on the completion display screen 13.

Next, the routine proceeds to step S108, where input of the judgment of whether there is processing for generation of software for another version of the operating system is awaited from the generated software selection screen 12. If there is input, all of the environment files in the generation environment storage unit 14 are deleted, then the routine returns to step S101. If there is no input, the software generation processing ends.

Figure 3:
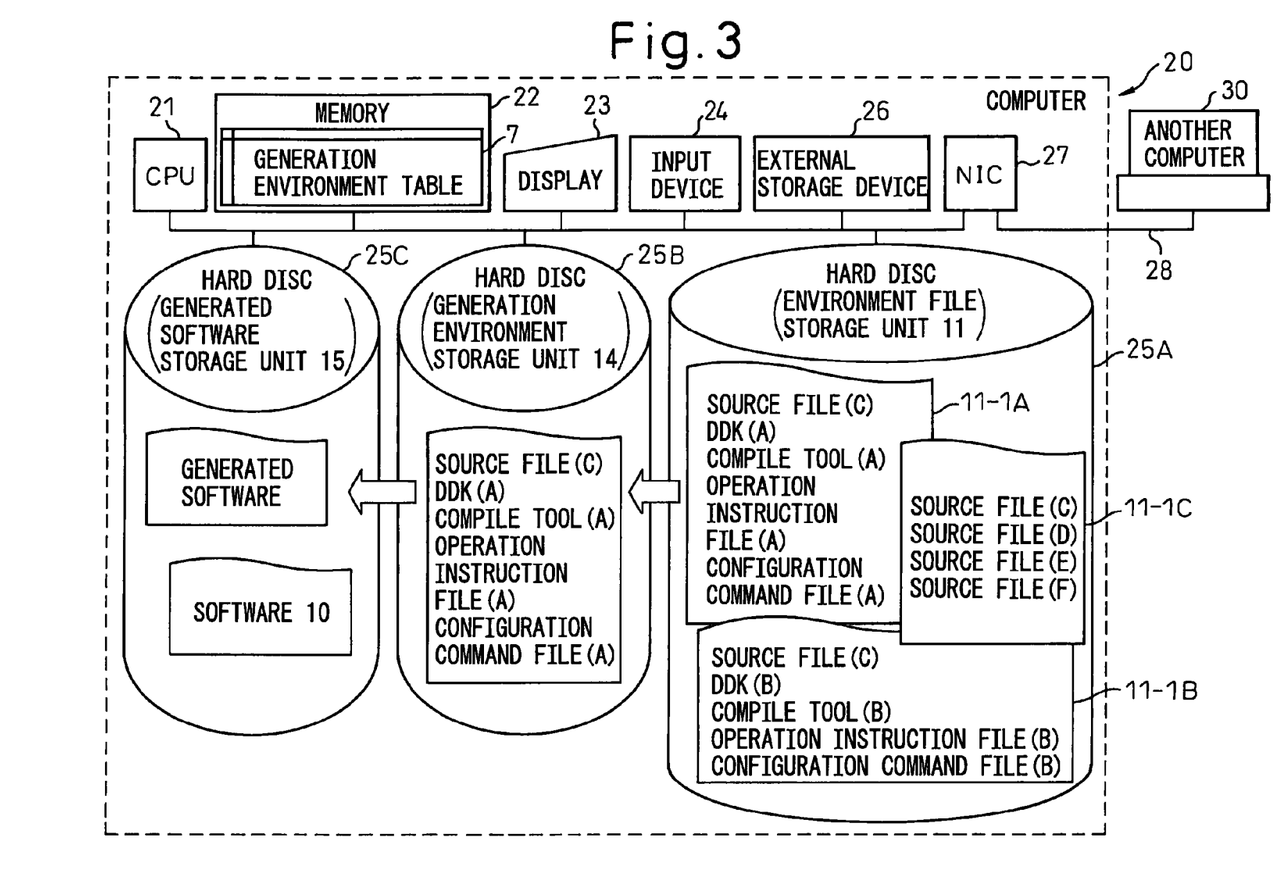
FIG. 3 is a view of hardware for running the multiple operating system version software generation support program according to the present invention.

FIG. 3 is a view showing an example of the configuration of hardware for running the multiple operating system version software generation support program of an embodiment of the present invention. The program 10 is, for example, executed by a computer 20 such as shown in FIG. 3. The computer 20 is provided with a CPU 21 for executing the required processing, a memory 22 for storing the processing results (for example, a random access memory (RAM)), a display 23, an input device 24 such as a keyboard and/or mouse, an external storage device 26 such as hard disks 25A, 25B, 25C or a CD/DVD drive, and a network interface card (NIC) 27. The computer 20 can be connected to another computer 30 through a network 28 comprised by an Ethernet® cable connected to the NIC 27.

The program 10 is stored in a storage medium, is loaded from the external storage device 26, or is downloaded from the other computer 30 through the network 28 and is stored under the control of the CPU 21 in any of the hard disk 25A or 25C of the computer 20. Next, the stored program 10 is executed by the CPU 21 and stored as an execution process or thread in the memory 22.

Further, the generated software selection dialog display processing 1, software generation environment judgment processing 2, software generation environment construction processing 3, software generating processing 4, software generation completion monitoring processing 5, and software generation completion display processing 6 shown in FIG. 1 are executed by the CPU 21.

The generation environment table 7 is stored in the hard disk 25A or 25C or, considering the processing speed, in the memory 22. The environment file storage unit 11 is stored in the hard disk 25A, the generation environment storage unit 14 in the hard disk 25B, and the generated software storage unit 15 in the hard disk 25C. In FIG. 3, the hard disks are shown as physically different hard disks, but these hard disks may also be obtained by theoretically partitioning a single disk. So long as the clean install environment of the generation environment storage unit 14 can be realized, functional separation by dividing folders in the same partition is also possible. Further, the hard disks may also be provided separately in the other computer 30.

The generated software selection screen 12 and the completion display screen 13 are displayed on the display 23 or the screen of another computer 30. The type of software, the version, and other selection information are input by the input device 24.

The environment file storage unit 11 of the hard disk 25A has two environment file storage folders, that is, an environment file folder 11-1A for the software C for version A of the operating system and an environment file folder 11-1B for the software C for version B of the operating system.

The environment file folder 11-1A of the software C for the version A of the operating system and the environment file folder 11-1B of the software C for the version B of the operating system have the same source file C. Each environment file folder has the same source file C, but different operating environment files, so the software C can be generated for the different versions A and B of the operating system.

Since the source files C are present in two folders, identity has to be maintained as explained above. For that reason, when a change occurs in either of the source files C in the files for the software C, the source files in the software C are synchronously processed to maintain their identity.

Further, the identity of the source files may be managed by providing a source file storage folder 11-1C for storing just the source files such as the source files C to F. In this case, since there is just one set of source files in the source file storage folder 11-1c, synchronization processing for identity becomes unnecessary. In this case, the software is generated by prescribing to compile the source file C in this folder 11-1c in the individual operation instruction files for generating the software C.

In the above explanation, the environment file storage folder 11-1 stored the compile tool, and the software generation environment construction processing 3 installed the compile tool in the generation environment storage unit 14, but when not utilizing the class library etc. attached to the compile tool, it is also possible to install it in advance in the same way as the operating system of the computer 20 and compile and link the environment files stored in the generation environment storage unit from that compile tool.

As explained above, in the present invention, there are provided a multiple operating system version software generating system generating software by compiling and linking a source program together with the library required for each type of software and/or each version of operating system and a multiple operating system version software generation support program and method for the same. Due to this, it is not necessary to provide source programs for a plurality of computer environments. A single environment may be used for generating software for each targeted type of software and/or version of operating system. The generation of software for different versions of an operating system in a single environment shortens the development period and therefore is extremely beneficial in the software industry where new developments are required every day.

Further, the present invention is directed toward operating system-dependent software development, but such a development environment can be applied to development of all sorts of types of software.

Many different embodiments of the present invention may be constructed without departing from the scope of the present invention, and it should be understood that the present invention is not limited to the specific embodiments described in this specification, except as defined in the appended claims.

What is claimed is:

1. A multiple operating system version program generating device for generating software for multiple versions of an operating system, comprising:
   an environment file storage unit configured for having environment file storage folders, each of the environment file storage folders corresponding to one of multiple versions of an operating system, each storing environment files including a library, at least one source program, and a compile and link operation instruction file describing a program instructing at least partial compile and link operations of the at least one source program and compile and link operations of the library;
   a generation environment table configured for defining storage positions of the versions of the operating system and the environment file storage folders;
   a generation environment storage unit configured for storing the environment files;
   a software generation environment construction unit configured for selecting an environment file storage folder corresponding to specific version of the operating system in accordance with the generation environment table, and copying environment files in the selected environment file storage folder from the environment file storage unit into the generation environment storage unit in advance of the execution of generating the software; and
   a software generating processing unit configured for executing the compile and link operations based on the compile and link operation instruction files in the generation environment storage unit.

2. The multiple operating system version software generating device as claimed in claim 1, wherein the compile and link operation instruction files instruct the at least partial compile and link operations of the at least one source program required for the software and the compile and link operations of the library by condition branch instructions based on the versions of the operating system.

3. A computer-readable medium having a multiple operating system version software generation support program for generating software for multiple versions of an operating system, the multiple operating system version software generation support program making a computer at least execute:
   selecting an environment file storage folder corresponding to specific version of the operating system in accordance with a generation environment table configured for defining storage positions of the versions of the operating system and environment file storage folders;

copying environment files in the selected environment file storage folder from the environment file storage unit into a generation environment storage unit in advance of the execution of generating the software, each of the environment file storage folders corresponding to one of multiple versions of an operating system, each storing environment files including a library, at least one source program, and a compile and link operation instruction file describing a program instructing at least partial compile and link operations of the at least one source program and compile and link operations of the library; and making a compile tool execute the compile and link operations based on the compile and link operation instruction files in the generation environment storage unit.

4. The computer-readable medium having the multiple operating system version software generation support program as claimed in claim 3, wherein the compile and link operation instruction files instruct the at least partial compile and link operations of the at least one source program required for the software and the compile and link operations of the library by condition branch instructions based on the versions of the operating system.

5. A multiple operating system version software generating method for generating software for multiple versions of an operating system, the multiple operating system version software generating method comprising:

selecting an environment file storage folder corresponding to specific version of the operating system in accordance with a generation environment table configured for defining storage positions of the versions of the operating system and environment file storage folders;

copying environment files in the selected environment file storage folder from the environment file storage unit into a generation environment storage unit in advance of the execution of generating the software, each of the environment file storage folders corresponding to one of multiple versions of an operating system, each storing environment files including a library, at least one source program, and a compile and link operation instruction file describing a program instructing at least partial compile and link operations of the at least one source program and compile and link operations of the library; and making a compile tool execute the compile and link operations based on the compile and link operation instruction files in the generation environment storage unit.

* * * * *